US009737840B2

(12) United States Patent
Hasegawa et al.

(10) Patent No.: US 9,737,840 B2
(45) Date of Patent: Aug. 22, 2017

(54) AIR CLEANER

(71) Applicant: TIGERS POLYMER CORPORATION, Osaka (JP)

(72) Inventors: Minoru Hasegawa, Hyogo (JP); Akiwo Shirakawa, Hyogo (JP)

(73) Assignee: TIGERS POLYMER CORPORATION, Osaka (JP)

( * ) Notice: Subject to any disclaimer, the term of this patent is extended or adjusted under 35 U.S.C. 154(b) by 70 days.

(21) Appl. No.: 14/867,617

(22) Filed: Sep. 28, 2015

(65) Prior Publication Data

US 2016/0325218 A1   Nov. 10, 2016

(30) Foreign Application Priority Data

May 7, 2015   (JP) ................. 2015-094554

(51) Int. Cl.
| | | |
|---|---|---|
| B01D 46/00 | (2006.01) | |
| F01N 1/08 | (2006.01) | |
| F01N 1/10 | (2006.01) | |
| F01N 1/02 | (2006.01) | |
| F01N 1/00 | (2006.01) | |
| B01D 46/42 | (2006.01) | |
| B01D 46/10 | (2006.01) | |

(52) U.S. Cl.
CPC ..... *B01D 46/4236* (2013.01); *B01D 46/0005* (2013.01); *B01D 46/0043* (2013.01); *B01D 46/10* (2013.01)

(58) Field of Classification Search
CPC ..... F01N 1/08; F01N 1/10; F01N 1/02; F01N 1/00; B01D 46/00

USPC ....... 96/386, 384, 381; 55/385.3; 123/198 E, 123/184.57; 181/229, 272, 268, 275
See application file for complete search history.

(56) References Cited

U.S. PATENT DOCUMENTS 3,201,338 A * 8/1965 Pennington ............... F01N 1/04
                                                          204/193
3,769,780 A * 11/1973 Kasten ............... B01D 46/0024
                                                           55/463
4,124,091 A * 11/1978 Mizusawa ................. F01N 1/02
                                                          181/231
(Continued)

FOREIGN PATENT DOCUMENTS

| JP | 06076651 | 10/1994 |
|---|---|---|
| JP | 09088749 | 3/1997 |
| JP | 2001323853 A2 | 11/2001 |

*Primary Examiner* — Jacob T Minskey
*Assistant Examiner* — Minh-Chau Pham
(74) *Attorney, Agent, or Firm* — Rankin, Hill & Clark LLP

(57) ABSTRACT

An air cleaner of this disclosure includes a hollow case, a filter element, and an opening end member. The hollow case defines an expanded space; the filter element defines an upstream-side expanded space and a downstream-side expanded space in the expanded space; the case includes an intake port configured to bring an upstream-side duct into communication with the upstream-side expanded space; the opening end member is formed from a material having an air permeability in a range of 0.3 to 100 sec/300 cc, and is integrated on an inner side of the intake port so as to project into the upstream-side expanded space and so as to extend a duct wall of the intake port; and D representing a diameter of the opening end member and L representing a length thereof satisfy $0.25D \leq L \leq 2.0D$.

9 Claims, 11 Drawing Sheets

(56) References Cited

U.S. PATENT DOCUMENTS

| | | | | |
|---|---|---|---|---|
| 4,393,652 A | * | 7/1983 | Munro | F01N 1/10 |
| | | | | 181/243 |
| 6,622,680 B2 | | 9/2003 | Kino | |
| 6,852,151 B2 | * | 2/2005 | Bloomer | F02M 35/14 |
| | | | | 123/184.57 |
| 7,320,723 B2 | * | 1/2008 | Sewell, Sr. | B01D 53/0415 |
| | | | | 55/385.3 |
| 7,819,223 B2 | * | 10/2010 | Celik | F04D 29/664 |
| | | | | 181/268 |
| 2003/0062013 A1 | | 4/2003 | Kino | |

\* cited by examiner

US 9,737,840 B2

AIR CLEANER

CROSS-REFERENCE TO RELATED APPLICATION

This application is based on Japanese Patent Application No. 2015-094554 filed with the Japan Patent Office on May 7, 2015, the entire content of which is hereby incorporated by reference.

BACKGROUND

1. Technical Field

This disclosure relates to an air cleaner.

2. Related Art

An air cleaner is provided midway through an air flow passageway, for example, to filter the air flowing through the inside of the air flow passageway. Such an air cleaner is used in a stretch of air flow passageway, such as an intake system of an internal combustion engine for a car, an air-conditioning system or a cooling air delivery system. In an air flow passageway having such an air cleaner, noise coming from noise source such as an engine, a fan or a motor propagates inside the air flow passageway. In such an air flow path, air column resonance occurs in the duct system connected to the air cleaner. Therefore, there has been a demand for reducing noise propagating inside the air flow passageway.

A technique for reducing noise propagating through an air flow passageway, which has been developed or put into practical use, includes a technique in which the air cleaner in the air flow passageway itself is utilized as an expansion chamber, a technique in which a resonance-type silencer, such as a Helmholtz resonator, is provided in the duct or in the air cleaner, and a technique in which a sound-absorbing material is provided.

For example, JP-A-09-88749 discloses a technique in which a sound-absorbing material is provided at the connecting portion between the air cleaner and the air intake duct. JP-UM-A-06-076651 discloses a technique in which a sound-absorbing material is placed along the case inner surface of the air cleaner. In the technique described in JP-UM-A-06-076651, a sound-absorbing material is covered with a water-impermeable membrane.

A technique called "porous duct" has been known in the art as a technique for suppressing air column resonance occurring in a duct system connected to an air cleaner. According to this technique, an air-permeable portion is provided in a part of the duct wall formed from a non-air-permeable material. A porous duct is an attempt to reduce noise propagating through the duct by preventing the air column resonance in the duct system. For example, as a porous duct, the technique described in JP-A-2001-323853 is known in the art. A characteristic feature of this technique lies in a porous material, such as a non-woven fabric, having a moderate air-permeability attached to the duct wall so as to cover a hole provided in the middle section of the non-air-permeable duct wall. Thus, the space inside the duct and the outside space are brought into communication with each other through the porous material. Moreover, a porous duct described in JP-A-2001-323853 includes a non-woven fabric that is heat-welded to an opening at the tip of a small tubular portion that is provided so as to project from the wall surface of the duct body. With such a duct, it is possible to suppress the occurrence of air column resonance in the duct system by adjusting the air permeability of the porous material. Thus, it is possible to reduce noise propagating through the duct system. This also provides an advantage that a non-woven fabric can be easily attached, and an advantage that the air flow resistance of the duct can be reduced.

SUMMARY

An air cleaner r of this disclosure includes a hollow case, a filter element, and an opening end member. The hollow case defines an expanded space; the filter element defines an upstream-side expanded space and a downstream-side expanded space in the expanded space; the case includes an intake port configured to bring an upstream-side duct into communication with the upstream-side expanded space, and an exhaust port configured to bring a downstream-side duct into communication with the downstream-side expanded space; the opening end member is formed from a material having an air permeability in a range of 0.3 to 100 sec/300 cc, and is integrated on an inner side of the intake port so as to project into the upstream-side expanded space and so as to extend a duct wall of the intake port; and D representing a diameter of the opening end member and L representing a length thereof satisfy $0.25D \leq L \leq 2.0D$.

DETAILED DESCRIPTION

Figure 1:
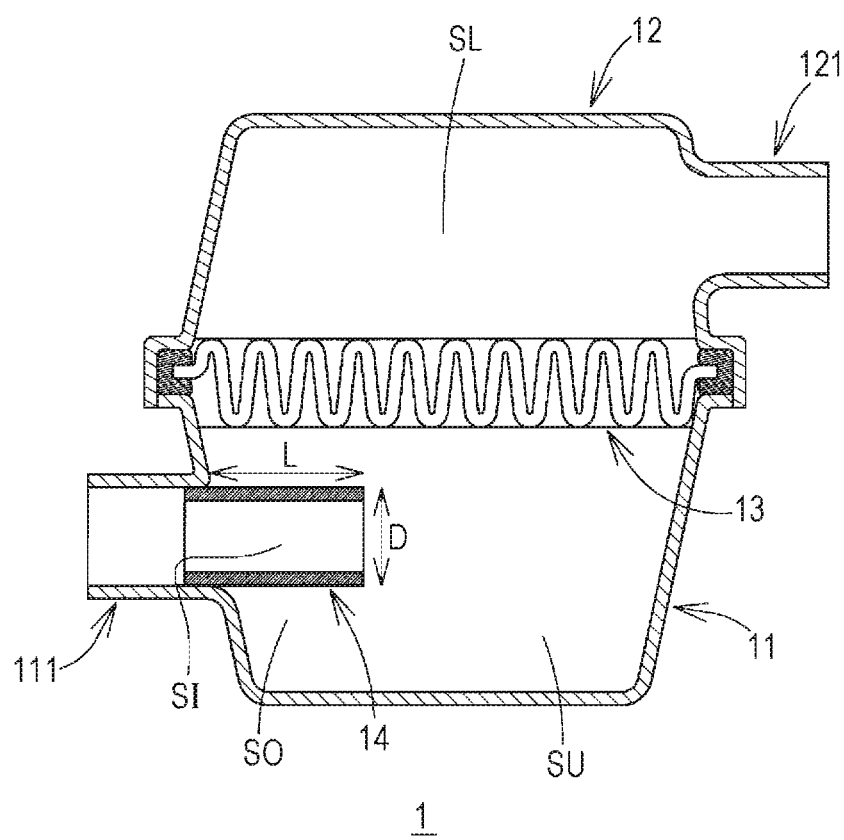
FIG. 1 is a diagram illustrating an air cleaner according to a first embodiment of this disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

JP-A-09-88749 and JP-UM-A-06-076651 each describe a silencing technique using a sound-absorbing material. Typically, it is difficult with these techniques to suppress air column resonance occurring in a duct system connected to an air cleaner.

The technique described in JP-A-2001-323853 is capable of suppressing air column resonance of an air intake duct. With this technique, however, it is necessary to provide holes in the duct wall in a middle section of the air intake duct. Therefore, an air leaks out or comes in through the holes provided in the duct wall. For example, if a duct of the technique in JP-A-2001-323853 is connected to an air cleaner and used as an air intake duct for supplying an air into a car engine, an air having been heated in an engine room enters the air intake duct through the holes provided in the duct wall. This may increase the intake air temperature, leading to a decrease in the power of the engine.

That is, with the techniques disclosed in JP-A-09-88749 and JP-UM-A-06-076651, it is not possible to suppress the air column resonance in the air duct connected to the air cleaner. With the technique disclosed in JP-A-2001-323853, an air moves between the inside and the outside of the duct through an opening that is provided at a certain area other than the position (an inlet of an air intake duct for an engine) at which the air is supposed to be taken in.

An object of this disclosure is to provide an air cleaner capable of suppressing the air column resonance of the duct connected to the air cleaner by using a technical means that is different from the duct of JP-A-2001-323853.

The inventors have found as a result of earnest studies that the above problem can be solved by an air cleaner configured as follows, and thus completed the air cleaner of this disclosure. According to the present cleaner, a hollow tubular member formed from a specific air-permeable material (hereinafter referred to as an "opening end member" as necessary) is integrated on the inner side of the intake port and/or the exhaust port of the air cleaner. The present cleaner is configured so that the space inside the opening end member is directly continuous to the space outside the opening end member.

An air cleaner of this disclosure includes a hollow case, a filter element, and an opening end member. The hollow case defines an expanded space; the filter element defines an upstream-side expanded space and a downstream-side expanded space in the expanded space; the case includes an intake port configured to bring an upstream-side duct into communication with the upstream-side expanded space, and an exhaust port configured to bring a downstream-side duct into communication with the downstream-side expanded space; the opening end member is formed from a material having an air permeability in a range of 0.3 to 100 sec/300 cc, and is integrated on an inner side of the intake port so as to project into the upstream-side expanded space and so as to extend a duct wall of the intake port; and D representing a diameter of the opening end member and L representing a length thereof satisfy $0.25D \leq L \leq 2.0D$ (a first embodiment).

Alternatively, an air cleaner of this disclosure includes a hollow case, a filter element, and an opening end member. The hollow case defines an expanded space; the filter element defines an upstream-side expanded space and a downstream-side expanded space in the expanded space; the case includes an intake port configured to bring an upstream-side duct into communication with the upstream-side expanded space, and an exhaust port configured to bring a downstream-side duct into communication with the downstream-side expanded space; the opening end member is formed from a material having an air permeability in a range of 0.3 to 100 sec/300 cc, and is integrated on an inner side of the exhaust port so as to project into the downstream-side expanded space and so as to extend a duct wall of the exhaust port; and D representing a diameter of the opening end member and L representing a length thereof satisfy $0.25D \leq L \leq 2.0D$ (a second embodiment).

Moreover, in the first and second embodiments, the thickness of air-permeable material of the opening end member may be in a range of 0.5 to 5 mm (a third embodiment). In addition, in the third embodiment, a reinforcement body is integrated to the opening end member (a fourth embodiment).

With an air cleaner of this disclosure (the first embodiment), it is possible to suppress air column resonance of an upstream-side duct connected to the air cleaner. This suppresses the increase of duct noise at a particular frequency. According to the second embodiment, it is possible to suppress the air column resonance of a downstream-side duct connected to the air cleaner. This suppresses the increase of duct noise at a particular frequency.

According to the third embodiment, although the thickness of the air-permeable material of the opening end member is as small as 0.5 to 5 mm, it is possible to suppress air column resonance of the duct over a frequency range of 1000 Hz or less. According to the embodiment of the fourth disclosure, a reinforcement body is integrated with the opening end member. Therefore, it is possible to suppress deformation of the opening end member.

The embodiments of this disclosure will be described below with reference to the drawings, by exemplifying an air cleaner for filtering the air supplied into a car engine. The disclosure is not limited to the specific embodiments to be illustrated below. Modifications to a part of any specific embodiment below shall fall within the scope of this disclosure. FIG. 1 illustrates an air cleaner 1 according to the first embodiment of this disclosure. FIG. 1 is a cross-sectional view illustrating the air cleaner 1.

The air cleaner 1 includes a lower case 11, an upper case 12, a filter element 13, and an opening end member 14. The upper case 12 and the lower case 11 are combined together to form a single hollow case. This case defines an expanded space in the air flow passageway. The filter element 13 is arranged inside the case so that the peripheral portion of the element is sandwiched between the upper case 12 and the lower case 11. Thus, the filter element 13 defines an upstream-side expanded space SU and a downstream-side expanded space SL within the expanded space, so as to divide the expanded space in two. The sandwiched peripheral portion of the filter element 13 is sealed as necessary.

The lower case 11 includes an intake port 111. An upstream-side duct (not illustrated) is connected to the intake port 111. The space inside the upstream-side duct is in communication with the upstream-side expanded space SU. On the other hand, the upper case 12 includes an exhaust port 121. A downstream-side duct (not illustrated) is connected to the exhaust port 121. The space inside the downstream-side duct is in communication with the downstream-side expanded space SL. The upstream-side duct, the air cleaner 1 and the downstream-side duct are connected together, thereby forming a stretch of air flow passageway. The air flow passageway filters the air and guides the air into the engine.

The air cleaner 1 may include an attachment member or a silencer (e.g., a resonance-type silencer, etc.), as necessary.

There is no particular limitation on the specific configuration of the case, the filter element, the sealant, etc., of the air cleaner. Known configurations may be used, for example.

The lower case 11 and the upper case 12, which are box-shaped, are formed from a non-air-permeable material. Examples of the non-air-permeable material include a thermoplastic resin, a thermosetting resin, and a metal. The lower case 11 and the upper case 12 of the present embodiment are formed by injection-molding a polypropylene resin. The upstream-side duct and the downstream-side duct are pipe-shaped, and are normally formed from a non-air-permeable material such as a thermoplastic resin or a rubber.

The opening end member 14 is integrated on the inner side of the intake port 111 so as to extend the inner wall of the intake port 111. The integration may be done by bonding, adhesion or welding, as well as insert molding, or mechanical attachment (attachment through engaging or locking) by means of a snap-in, a band, or a pin. The opening end member 14 and the intake port 111 may be attached and integrated together so that there is no gap therebetween, by fitting them together.

The opening end member 14 is formed in a tubular shape by an air-permeable material. Examples of the air-permeable material include a non-woven fabric, a foamed resin (foam sponge), and a filter paper. When a foamed resin is used, one may use a foamed resin having an open-celled structure. When the air-permeable material is a filter paper or a non-woven fabric, the air permeability may be adjusted by impregnating it with a binder, or the like. With the binder with which the material is impregnated, it is possible to increase the stiffness of the material, and to increase the shape retention property of the opening end member 14. In the present embodiment, the tubular opening end member 14 is formed by processing a non-woven fabric.

The hollow tubular opening end member 14 is formed so as to extend the duct wall of the intake port 111 into the upstream-side expanded space SU. In the present embodiment, the cylindrical opening end member 14 and the cylindrical intake port 111 have a generally equal diameter D, and are fitted together.

The inner space SI and the outer space SO of the tubular opening end member 14 are directly continuous to each other so as to form a part of the upstream-side expanded space SU. That is, the opening end member 14 is provided so as to project into the upstream-side expanded space SU, and the inner surface and the outer surface of the opening end member 14 are therefore exposed to the upstream-side expanded space SU.

In the air cleaner 1, the opening end member 14, which is located at the distal end of the upstream-side duct, forms an air-permeable duct wall. The intake port 111 forms a non-air-permeable duct wall, as does the upstream-side duct.

With the air cleaner 1 provided in a stretch of air flow passageway, the section from the upstream-side duct to the intake port 111 has a non-air-permeable duct wall. The opening end member 14 portion, which is adjacent to the intake port, is provided as an air-permeable duct wall projecting into the expanded space of the air cleaner.

The shape of the opening end member 14 will be described in more detail. The opening end member 14 is provided in the air cleaner so that D representing its diameter and L representing its length satisfy the relationship $0.25D \leq L \leq 2.0D$. More specifically, the diameter D refers to the representative diameter of the cross section of the tubular opening end member 14. The diameter D corresponds to the diameter of a circular cross section, the length of the major axis of an elliptical cross section, and the length of the long side of a rectangular cross section. As illustrated in FIG. 1, the length L refers to the length in the pipe axis direction of a portion of the opening end member 14 that is not fitting the intake port 111. The diameter D and the length L may be set so as to satisfy particularly $0.5D \leq L \leq 1.5D$. If the length L of the air-permeable portion is too short, it is difficult to obtain the resonance suppressing effect described below. Moreover, increasing the length L of the air-permeable portion (L>2.0D) provides no further significant improvement to the resonance suppressing effect. L being too long is disadvantageous in terms of retaining the shape of the portion of the opening end member 14 and air flow resistance of the air cleaner.

The air permeability of the air-permeable material of the opening end member 14 will be described. The air permeability of the air-permeable material is in a range of 0.3 to 100 sec/300 cc. The air permeability can be measured by a method in conformity with the Gurley test method defined in JIS P8117. The air permeability may be in a range of 0.5 to 10 sec/300 cc. The air permeability can be adjusted so as to be within such a range by utilizing a binder, a heat press, and the like, as necessary. The opening end member 14 can be molded by using an air-permeable material such as a non-woven fabric whose air permeability is adjusted as described above.

The thickness of the air-permeable material of the opening end member 14 can be set in a range of 0.5 to 5 mm. According to the present embodiment, it is possible to suppress the resonance phenomenon over a frequency range of 1000 Hz or less, despite such a small thickness of the air-permeable material. With a thin air-permeable material, the space occupied by the opening end member 14 is small and the air cleaner 1 can also provide a good space-conserving property.

The air cleaner 1 described above can be manufactured by a known manufacturing method. For example, the opening end member 14 can be produced by cutting a non-woven fabric into a strip, rolling up the strip into a cylindrical shape with its ends overlapping each other, and bonding or welding the overlap portion.

The functions and effects of this disclosure will be described.

Figure 3:
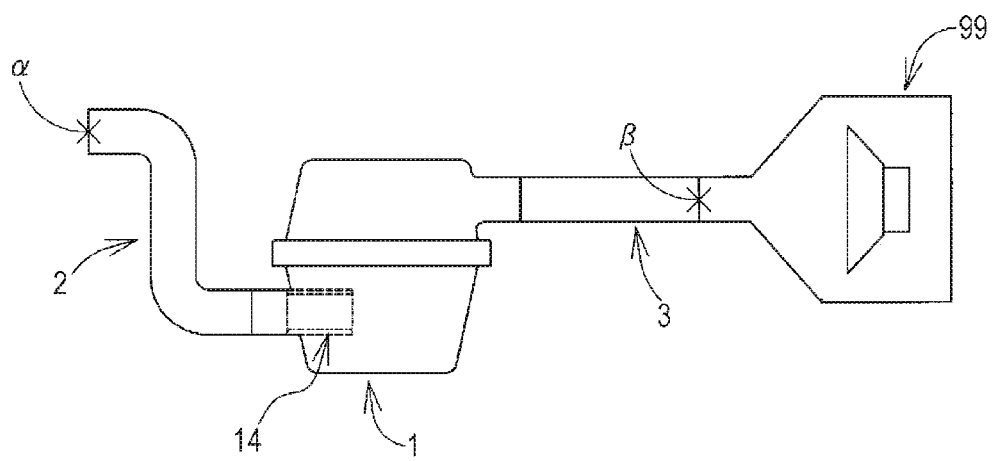
FIG. 3 is a schematic diagram illustrating a method of measuring the amount of sound attenuation.

With the air cleaner 1, in a stretch of air flow passageway configured to include the air cleaner 1 therein, it is possible to suppress the air column resonance, which may occur in the upstream-side duct connected to the intake port 111. The functions and effects of the air cleaner 1 will now be described, with reference to test results. An upstream-side duct having a diameter of 60 mm and a length of 400 mm is connected to the intake port 111 of the air cleaner 1. A downstream-side duct having a diameter of 60 mm and a length of 300 mm is connected to the exhaust port 121 of the air cleaner 1. Note that the amount of sound attenuation, which represents the silencing effect, is an indicator used for evaluating the silencing effect and is obtained as follows. That is, an upstream-side duct 2, the air cleaner 1 and a downstream-side duct 3, which are to be tested, are connected together so as to form a stretch of air flow passageway as illustrated in FIG. 3. The distal end of the downstream-side duct is connected to a speaker device 99 for sound vibration. While the sound is emitted from the speaker, the sound pressure Pα (the sound pressure measured at a position α) on the exit side (the distal end opening at the most upstream position along the upstream-side duct), and the sound pressure Pβ (the sound pressure measured at a position β) on the sound source side (the distal end section at the most downstream position along the downstream-side duct) are measured. An indicator represented by the ratio therebetween (Pβ/Pα) is obtained as the amount of sound attenuation. A larger value of the amount of sound attenuation means there is more silencing effect, and a smaller value of the amount of sound attenuation means there is less silencing effect.

Figure 4:
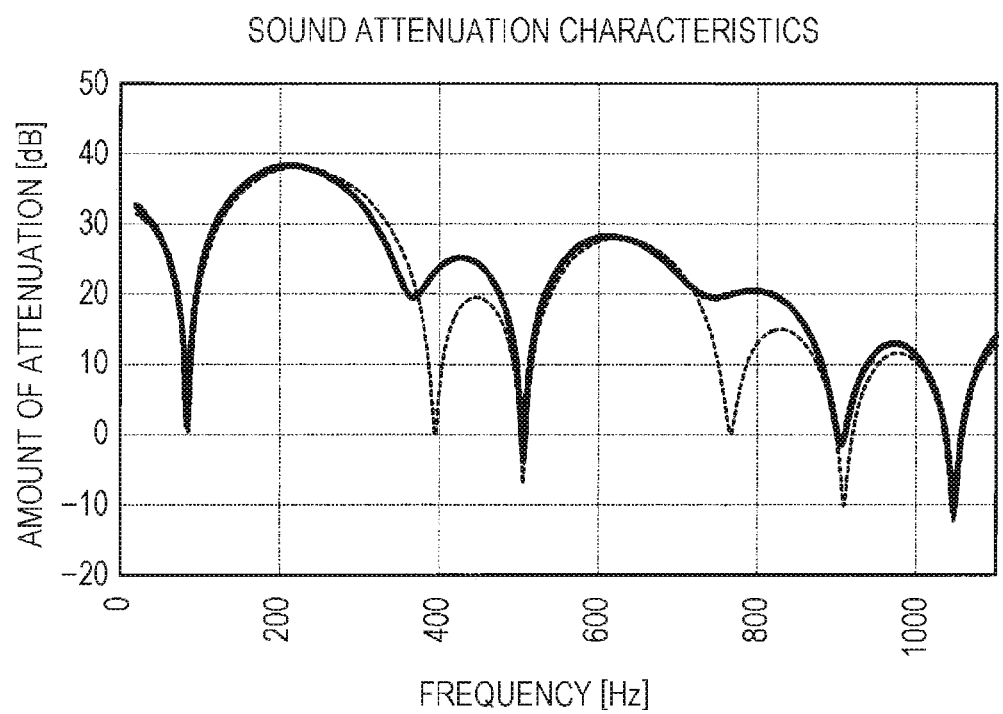
FIG. 4 is a graph illustrating the silencing effect of the air cleaner according to the first embodiment of this disclosure.

FIG. 4 illustrates a comparison between a test result for the air cleaner 1 of the first embodiment (Example 1) where the length of the opening end member is L=60 mm (L=1.0D), and a test result for a conventional air cleaner with no opening end member (Comparative Example 1). In Example 1, a non-woven fabric having an air permeability of 3 sec/300 cc and a thickness of 1.5 mm was used as the material of the opening end member 14.

As illustrated in FIG. 4, Comparative Example 1 had troughs, where the amount of sound attenuation decreased significantly, at 85 Hz, 395 Hz, 505 Hz, 765 Hz, 909 Hz, etc. These troughs indicate the presence of air column resonance in the air flow passageway. At 85 Hz, the entire system, including the upstream-side duct 2, the air cleaner 1 and the downstream-side duct 3, resonate. The resonance of the upstream-side duct 2 appears at 395 Hz (primary) and 765 Hz (secondary). The resonance of the downstream-side duct 3 appears at 505 Hz (primary) and 1045 Hz (secondary). At a frequency at which air column resonance occurs, the amount of sound attenuation is small, and noise problems are therefore likely to occur. With a simple pipe, air column resonance occurs at a frequency of any sound whose wavelength is n/2 (n=1, 2, . . . ) times the length of the pipe.

As illustrated in FIG. 4, in Example 1 where the opening end member 14 is provided inside the air cleaner 1, the drop of the amount of sound attenuation is suppressed even in the vicinity of frequencies (395 Hz and 765 Hz) at which air column resonance of the upstream-side duct 2 occurs. That is, the occurrence of air column resonance of the upstream-side duct 2 is suppressed. According to the present embodiment, it is not necessary to provide holes in the upstream-side duct in order to suppress air column resonance of the upstream-side duct. This reduces the amount of hot air to be taken in.

A presumed mechanism of suppressing air column resonance in the present embodiment will now be described. With the air cleaner 1 of the first embodiment, the opening end member 14, which has a particular air permeability and a particular length, is provided at the intake port 111 of the air cleaner so as to be connected to the upstream-side duct 2. It can be considered that the pipe length of the upstream-side duct 2 becomes acoustically ambiguous due to the presence of the opening end member 14. The upstream-side duct of Comparative Example 1 has an acoustically unambiguous (namely, definite) pipe length. As a result, the resonant frequency of the pipe is defined clearly, thereby causing a strong air column resonance. On the other hand, in the system using the air cleaner of Example 1, part of the air movement between the inside of the upstream-side duct 2 and the expanded space of the air cleaner occurs through the air-permeable material of the opening end member 14. The rest of the air movement occurs through the distal end opening of the opening end member 14. Thus, the position at which the air flows out of the upstream-side duct 2 into the upstream-side expanded space SU is ambiguous. As a result, the acoustic pipe length of the upstream-side duct 2 is ambiguous. This also makes ambiguous the resonant frequency, which is determined by the acoustic pipe length. It is presumed that the occurrence of a strong air column resonance is suppressed as described above.

This mechanism of suppressing air column resonance is based on a different principle from that of the mechanism of suppressing resonance using known techniques. This will be described below.

Figure 5:
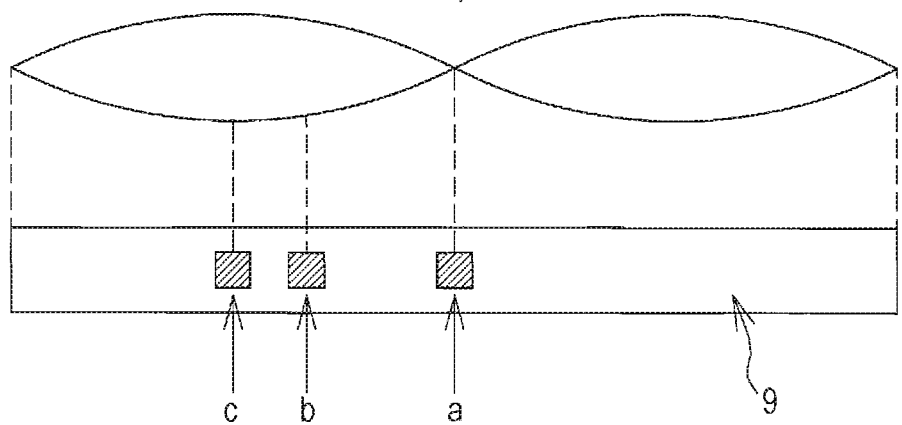
FIG. 5 is a diagram illustrating the relationship between the position of a hole of a porous duct and the resonance mode of the air column resonance.

A technique is known in the art to provide a hole in a part of a duct and provide a porous material in the hole (so-called a "porous duct technique"), as with the technique of JP-A-2001-123853. Also with this technique, it is possible to suppress air column resonance. FIG. 5 illustrates the relationship between the sound pressure distribution in the secondary resonance mode of a duct 9, and the position along the duct 9 at which a hole or a porous member is provided (the position at which the duct is provided with a porous material). A position 'a' is located at ½ the entire length of the duct 9, a position 'b' at ⅓ the entire length of the duct 9, and a position 'c' at ¼ the entire length of the duct 9. Comparative Example 2 was carried out using a porous duct with a hole and a porous material provided at the position 'a'. Comparative Example 3 was carried out using a porous duct with a hole and a porous material provided at the position 'b'. Comparative Example 4 was carried out using a porous duct with a hole and a porous material provided at the position 'c'.

Figure 6:
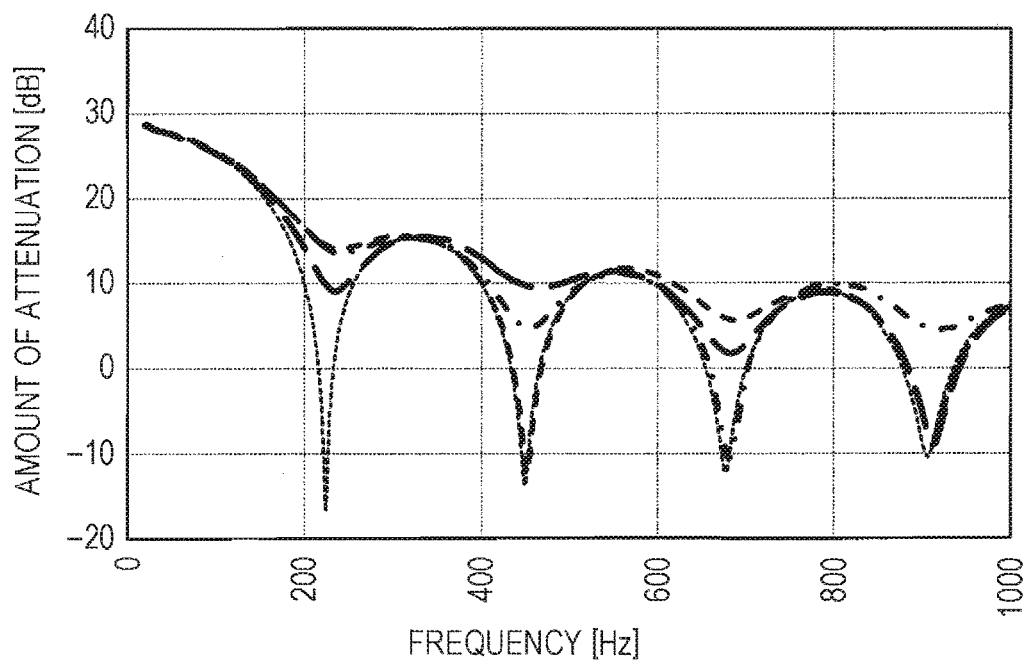
FIG. 6 is a graph illustrating the variation of the silencing effect depending on the position of a hole of a porous duct.

FIG. 6 illustrates a result of comparing the amounts of sound attenuation. FIG. 6 illustrates a comparison between the amount of an ordinary straight pipe (Comparative Example 1) and those of porous ducts (Comparative Examples 2, 3 and 4).

As illustrated in FIG. 5, the porous duct technique is based on the principle that resonance is made less likely to occur by allowing the pressure to be relieved by making a hole at a position at which the sound pressure is increased by resonance (particularly, an antinode of the resonance mode). Thus, with a porous duct, it is possible to realize the resonance-suppressing effect if the position of the node of the resonance mode when resonance occurs is shifted from the position at which a hole or a porous member is provided. However, when a hole or a porous member is provided at a position corresponding to a node during resonance, the resonance suppressing effect is not substantially realized. For example, for a secondary resonance mode illustrated in FIG. 5, the effect can be expected if a hole or a porous member is provided at the position 'b' or position 'c'. However, the resonance suppressing effect cannot be expected when providing a hole or a non-woven fabric at the position 'a', which corresponds to the node.

As a result, in Comparative Example 2, the position 'a' corresponds to the node of the resonance mode at secondary resonance (450 Hz) and fourth-order resonance (900 Hz) of the duct, as illustrated in FIG. 6. Therefore, substantially no resonance suppressing effect is realized. In Comparative Example 3, the position 'h' corresponds to the node of the resonance mode at third-order resonance (675 Hz). Therefore, substantially no resonance suppressing effect is realized. In Comparative Example 4, the position 'c' corresponds to the node of the resonance mode at fourth-order resonance (900 Hz). Therefore, substantially no resonance suppressing effect is realized. The above description is directed to the principle and the effect of the suppression of air column resonance by using a porous duct technique. Note that the open end of the duct 9 is a position corresponding to a node of every resonance mode. Therefore, even if a hole or a non-woven fabric is provided at this position, it cannot be expected that air column resonance is suppressed based on the principle of the porous duct technique.

It is not impossible, but is practically difficult, to suppress air column resonance of the duct by means of an ordinary sound-absorbing material such as a glass wool. The silencing principle of an ordinary sound-absorbing material is based on a principle that a vibrating air flow movement by a generated sound is attenuated by the resistance of a minute structure such as the fiber of the sound-absorbing material, thereby dissipating the sound energy. Due to this principle, it is necessary to provide a sound-absorbing material having a large area and a larger thickness, depending on the frequency of the sound to be silenced, so that the sound-absorbing material is arranged at a position where there is a significant movement of the air. That is, if the sound-absorbing material is thin, the silencing effect at the lower frequency cannot be expected.

Figure 7:
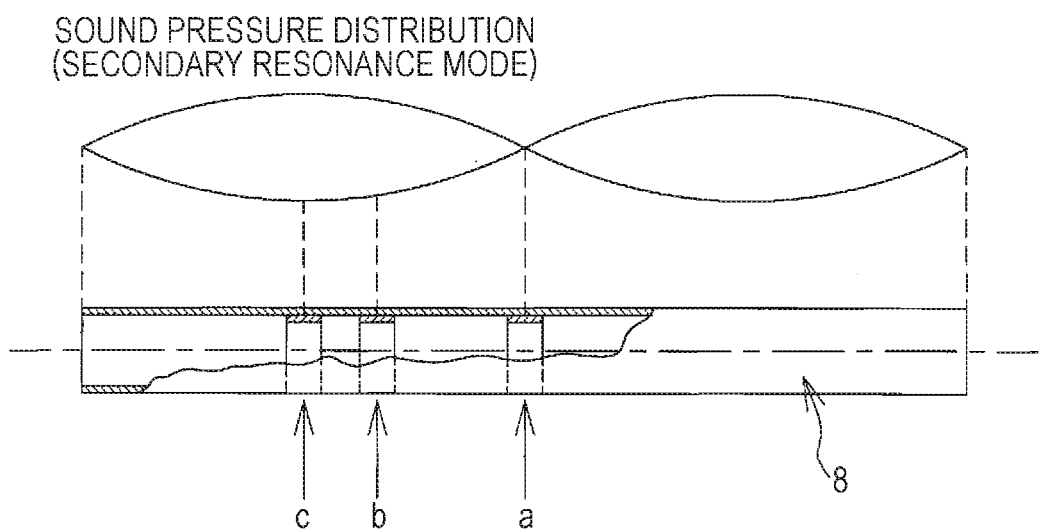
FIG. 7 is a diagram illustrating the relationship between the position of the sound-absorbing material and the resonance mode of the air column resonance.

FIG. 7 illustrates the relationship between the sound pressure distribution of the secondary resonance of a duct 8 and the position at which the sound-absorbing material is provided on the inner surface of the duct. A position 'a' is located at ½ the entire length of the duct 8, a position 'h' at ⅓ the entire length of the duct 8, and a position 'c' at ¼ the entire length of the duct 8. In Comparative Examples 5 to 7, a tubular glass wool sound-absorbing material was provided on the inner surface of the duct 8. In Comparative Example 5, the sound-absorbing material was provided at the position 'a'. In Comparative Example 6, the sound-absorbing material was provided at the position 'b'. In Comparative Example 7, the sound-absorbing material was provided at the position 'c'. Note that the thickness of the sound-absorbing material was set to 1.5 mm. The length L in the pipe axis direction of the portion where the tubular sound-absorbing material is provided and the diameter D thereof satisfy L=1.0D.

Figure 8:
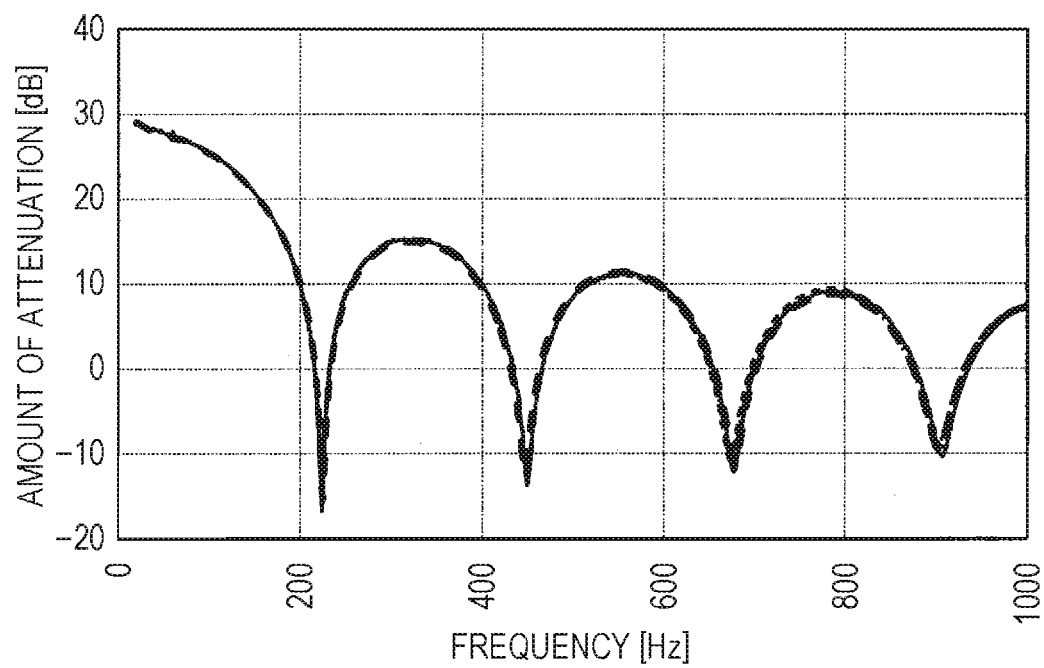
FIG. 8 is a graph illustrating the variation of the silencing effect depending on the position of the sound-absorbing material.

As indicated in the sound attenuation characteristics of FIG. 8, a sound-absorbing material having a thickness of about 1.5 mm shows substantially no resonance suppressing effect for any resonance, irrespective of whether the sound-absorbing material is provided at the position 'a', position 'b' or position 'c'. Generally, with a sound-absorbing material having a thickness of 5 mm or less, substantially no silencing effect can be expected at 1000 Hz or less.

As described above, the resonance suppressing effect of this disclosure as observed in the Example 1 is obtained based on a principle that is different from either the resonance-suppressing principle of a so-called porous duct or the silencing principle of a sound-absorbing material, which are conventional techniques. That is, the effect is realized based on the principle that a strong resonance no longer occurs as the acoustic pipe length becomes ambiguous. Therefore, it is possible to suppress air column resonance in an air duct even though an opening end member of an air-permeable material is provided at such a position with such a thickness that the effect cannot possibly be expected based on a conventional principle.

Figure 9:
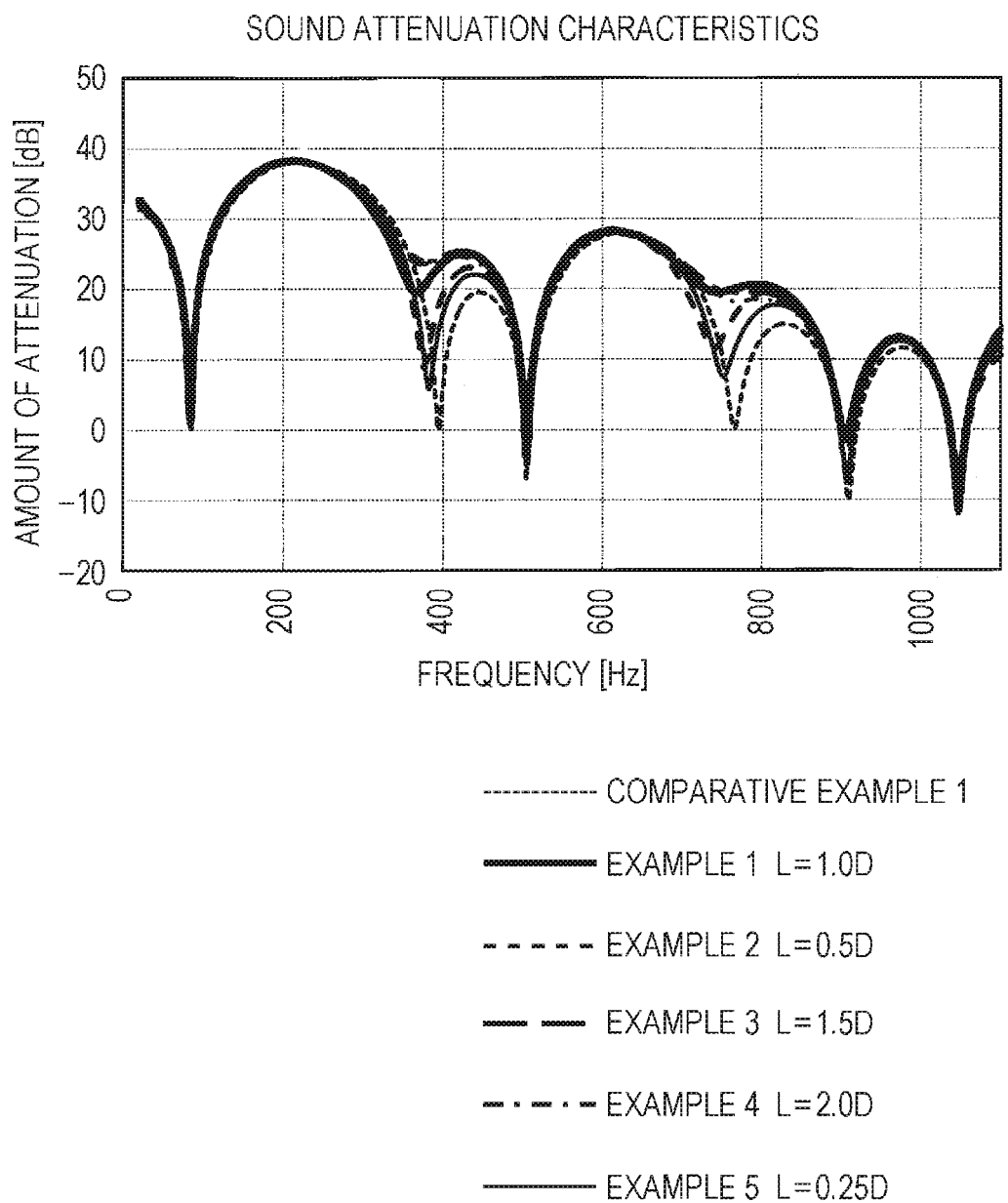
FIG. 9 is a graph illustrating the silencing effect obtained when varying the length of the opening end member of the air cleaner according to the first embodiment of this disclosure.

FIG. 9 illustrates the variation of the amount of acoustic attenuation when varying the length L of the opening end member 14 of the air cleaner 1 of Example 1 (the length of the air-permeable portion, which is obtained by fixing the opening end member 14 to the intake port 111). Even when L is relatively small satisfying L=0.25D (Example 5), an effect of suppressing air column resonance is obtained, as compared with the Comparative Example. When satisfying L=0.5D (Example 2), a significant effect of suppressing air column resonance is obtained. Thus, the effect of suppressing air column resonance improves by increasing L. Note that, however, the effect of suppressing air column resonance does not improve so much when L exceeds 1.5D (Example 3) and L=2.0D (Example 4) is satisfied.

Therefore, in order to reduce the size of the opening end member while suppressing air column resonance, D and L can be set so that so that a diameter D of the opening end member 14 and a length L thereof satisfy 0.25D≤L≤2.0D.

This disclosure is not limited to the embodiment described above. Other embodiments realized by making various modifications to the above embodiment shall fall within the scope of this disclosure. Other embodiments of this disclosure will be described below. The description below focuses on what is different from the embodiment described above. Detailed description of the same parts as those of the embodiment described above will be omitted. Embodiments realized by combining together parts of the embodiments below, and embodiments realized by substituting parts of the embodiments below with parts of other embodiments, shall also fall within the scope of this disclosure.

Figure 2:
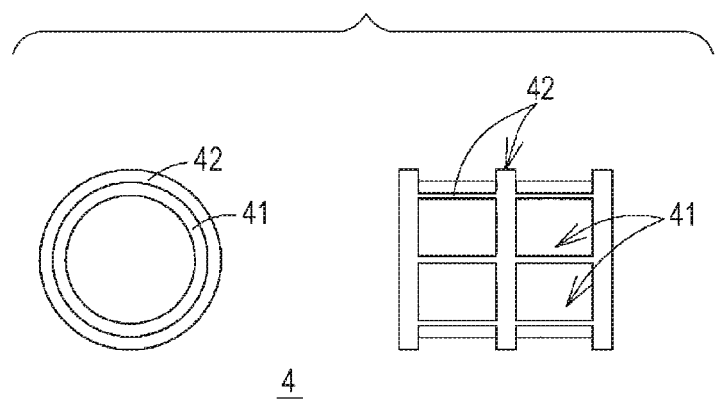
FIG. 2 is a diagram illustrating an opening end member used in an air cleaner of this disclosure.

A variation of the opening end member used in the embodiment of this disclosure will be described. An opening end member 4 illustrated in FIG. 2 includes a reinforcement body 42 for suppressing deformation. The opening end member 4 is integrated on the inner side of the intake port 111, as is the opening end member 14 of the first embodiment, thereby forming the distal end section of the upstream-side duct. Thus, the opening end member 4 provides the same effect as the opening end member 14. The reinforcement body 42 is integrated with the outer surface of a cylindrical opening end member body 41 formed from an air-permeable material. The reinforcement body 42 may include ring-shaped portions spaced apart from one another by a predetermined interval so as to suppress collapse of the opening end member 4. In the present embodiment, the reinforcement body 42 is formed in a lattice shape so as to have ring-shaped portions spaced apart from one another by a predetermined interval in the axial direction. The reinforcement body 42 is formed from a synthetic resin. The reinforcement body 42 is integrated with the opening end member body 41 by welding or bonding. Note that the reinforcement body 42 may be formed to be as thin as possible so as not to detract from the air permeability of the opening end member body 41.

Figure 10:
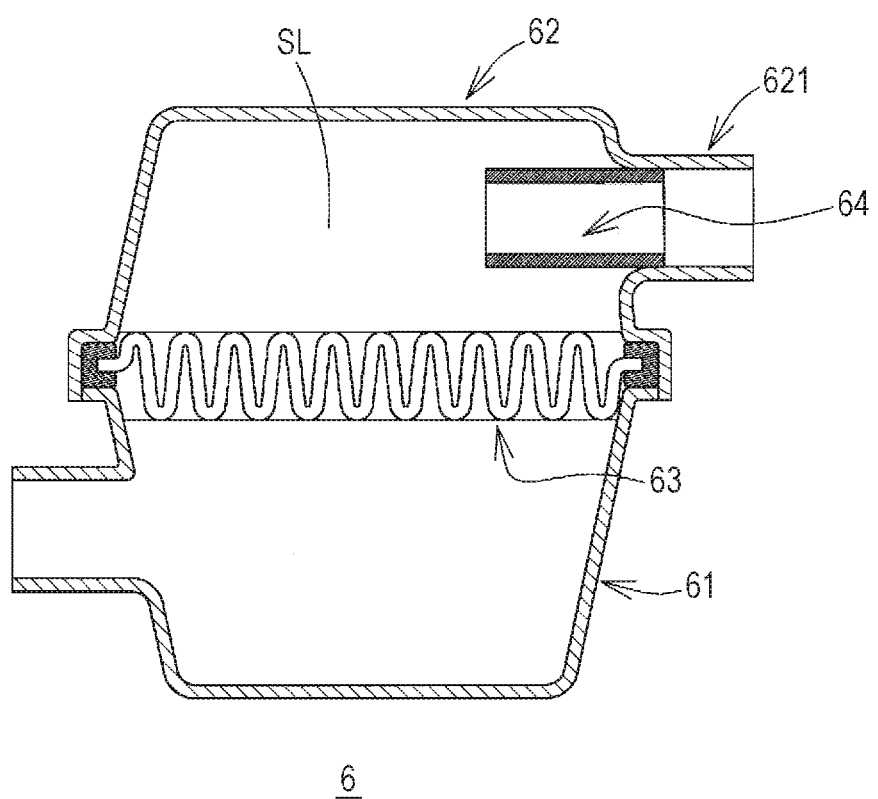
FIG. 10 is a diagram illustrating an air cleaner according to an embodiment of this disclosure, in which an opening end member is provided on the exhaust port side.

The description above focuses on the embodiment in which the opening end member 14 of the air cleaner 1 is attached to the intake port 111 of the lower case 11 so as to project into the upstream-side expanded space SU. Note that, however, this disclosure is not limited thereto. For example, the opening end member may be attached to the exhaust port of the upper case so as to project into the downstream-side expanded space SL. For an air cleaner according to the second embodiment of this disclosure illustrated in FIG. 10, an air cleaner 6 includes a lower case 61, an upper case 62, a filter element 63, and an opening end member 64. The opening end member 64 is attached to an exhaust port 621 of the upper case so as to project into the downstream-side expanded space SL.

Figure 11:
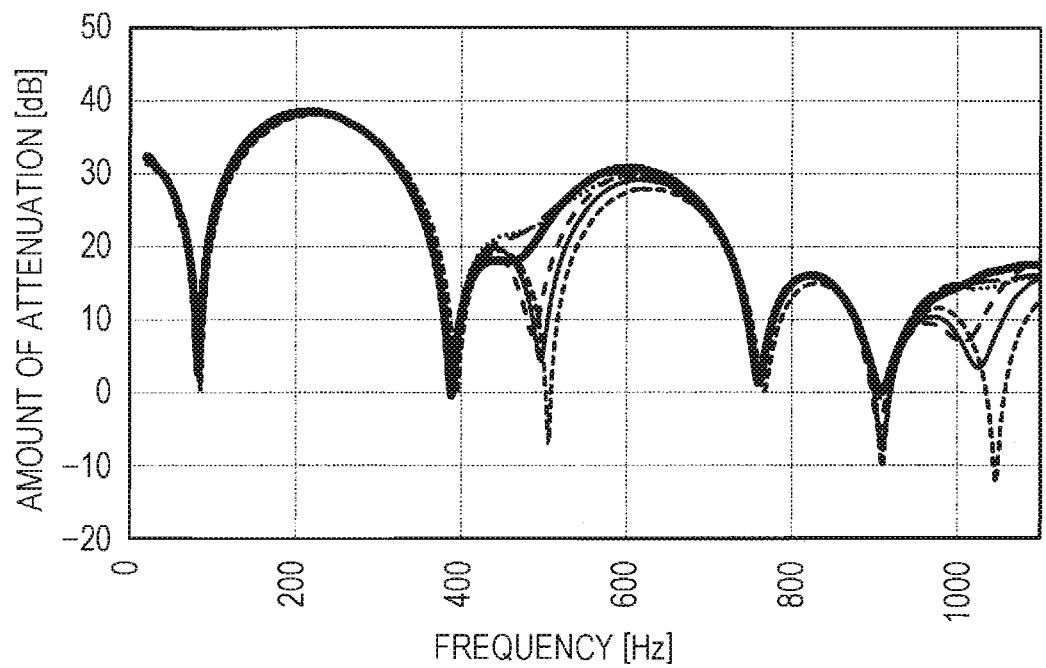
FIG. 11 is a graph illustrating the silencing effect of an air cleaner according to an embodiment of this disclosure, in which an opening end member is provided on the exhaust port side.

In the second embodiment, as in the first embodiment, there is obtained an advantageous effect of suppressing the resonance of the downstream-side duct (not illustrated) to which the opening end member 64 is attached. FIG. 11 illustrates the silencing effect of the second embodiment. The figure shows results for Example 6 where the length L of the opening end member 64 formed from a non-woven fabric having an equal air permeability and thickness to those of the opening end member 14 satisfies L=1.0D, Example 7 where L=0.5D is satisfied, Example 8 where L=1.5D is satisfied, Example 9 where L=2.0D is satisfied, and Example 10 where L 0.25D is satisfied. The same upstream-side duct and downstream-side duct as those of the first embodiment were used. In the second embodiment, the resonance suppressing effect is obtained at 505 Hz (primary resonance) and 1047 Hz (secondary resonance), which correspond to the air column resonance frequency of the downstream-side duct, in any of the examples (Examples 6 to 10).

Figure 12:
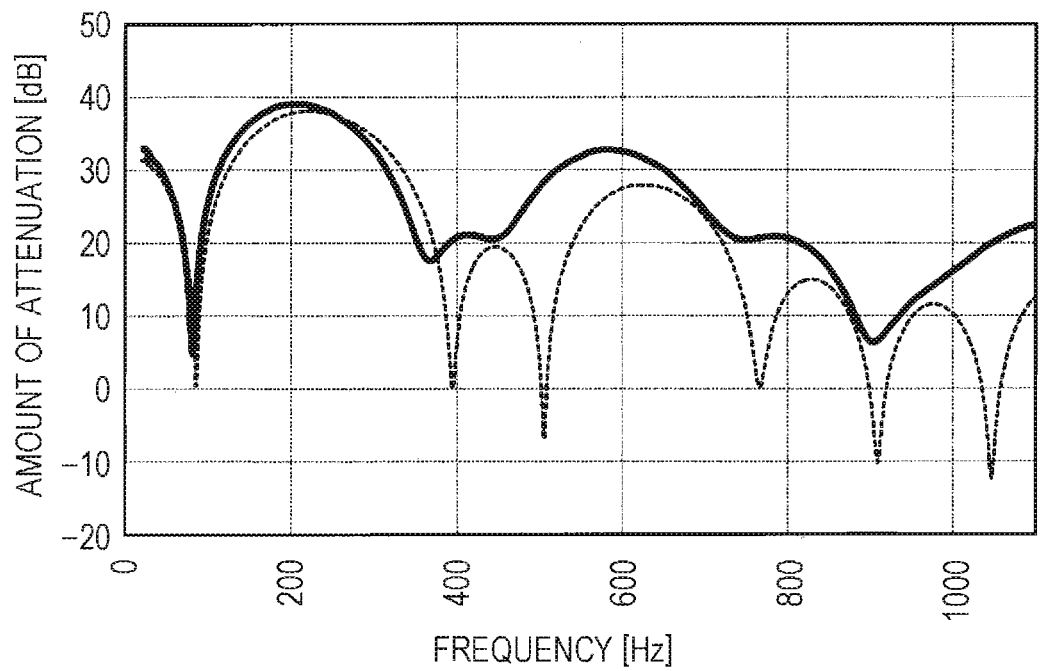
FIG. 12 is a graph illustrating the silencing effect of an air cleaner according to an embodiment of this disclosure, in which an opening end member is provided both on the intake port side and on the exhaust port side.

The opening end member may be provided both at the intake port and at the exhaust port of the air cleaner. FIG. 12 illustrates the silencing effect for an example (Example 11) in which the opening end members 14 and 64, satisfying L=1.0D, are provided at the intake port and the exhaust port, respectively, of the air cleaner. In Example 11, resonance is mostly suppressed at frequencies in the vicinity of 400 Hz and above. Thus, there is obtained a desirable silencing characteristic.

The air cleaner of this disclosure may include a so-called "drain hole" or "tuning hole". The air cleaner of this disclosure may include a resonance-type silencer such as a Helmholtz resonator or a ¼ wavelength resonance tube (side branch).

The embodiment described above is directed to an example where the air cleaner is used in the air intake passage of a car engine. However, the application of the stretch of air flow passageway provided with the air cleaner is not limited thereto. For example, the air cleaner of this disclosure can be used so as to form a part of an air flow passageway of a battery cooling system for sending a cooling air to a battery (pack) assembly carried on a hybrid car or an electric car. The air cleaner of this disclosure can also be used as an air cleaner forming a part of an air flow passageway for sending an air in an air-conditioning system.

An air cleaner including an opening end member has a high industrial applicability as it can be used with ducts for sending an air in general.

The air cleaner of this disclosure may be any of first to fourth air cleaners below.

The first air cleaner is an air cleaner provided midway through a stretch of air flow passageway to filter an air flowing through the air flow passageway, the air cleaner including a case defining an expanded space and a filter element, wherein; the filter element divides the expanded space into an upstream-side expanded space and a downstream-side expanded space; the case includes an intake port for connecting an upstream-side duct so that the upstream-side duct is in communication with the upstream-side expanded space, and an exhaust port for connecting a downstream-side duct so that the downstream-side duct is in communication with the downstream-side expanded space; the air cleaner further includes an opening end member formed from an air-permeable material in a tubular shape; the opening end member is provided at the intake port so as to project into the upstream-side expanded space and so as to extend a duct wall of the intake port; a space on an inner side of the tubular opening end member and a space on an outer side of the tubular opening end member are directly continuous as the upstream-side expanded space; 0.25D≤L≤2.0D is satisfied where D is a diameter and L is a length of the opening end member; and an air permeability of the air-permeable material of the opening end member is in a range of 0.3 to 100 sec/300 cc as measured by a method in conformity with the Gurley test method defined in JIS P8117.

The second air cleaner is an air cleaner provided midway through a stretch of air flow passageway to filter an air flowing through the air flow passageway, the air cleaner including a case defining an expanded space and a filter element, wherein: the filter element divides the expanded space into an upstream-side expanded space and a downstream-side expanded space; the case includes an intake port for connecting an upstream-side duct so that the upstream-side duct is in communication with the upstream-side expanded space, and a discharge port for connecting a downstream-side duct so that the downstream-side duct is in communication with the downstream-side expanded space; the air cleaner further includes an opening end member formed from an air-permeable material in a tubular shape; the opening end member is provided at the exhaust port so as to project into the downstream-side expanded space and so as to extend a duct wall of the exhaust port; a space on an inner side of the tubular opening end member and a space on an outer side of the tubular opening end member are directly continuous as the downstream-side expanded space; 0.25D≤L≤2.0D is satisfied where D is a diameter and L is a length of the opening end member; and an air permeability of the air-permeable material of the opening end member is in a range of 0.3 to 100 sec/300 cc as measured by a method in conformity with the Gurley test method defined in JIS P8117.

The third air cleaner is according to the first or second air cleaner, wherein the thickness of the air-permeable material of the opening end member is in a range of 0.5 to 5 mm.

The fourth air cleaner s according to the third air cleaner, wherein a reinforcement body is integrated with the opening end member.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An air cleaner comprising:
 a hollow case;
 a filter element; and
 an opening end member, wherein
 the hollow case defines an expanded space,
 the filter element defines an upstream-side expanded space and a downstream-side expanded space in the expanded space,
 the case includes an intake port configured to bring an upstream-side duct into communication with the upstream-side expanded space, and an exhaust port configured to bring a downstream-side duct into communication with the downstream-side expanded space,
 the opening end member is formed from a material having an air permeability in a range of 0.3 to 100 sec/300 cc measured by a method in conformity with the Gurley test method defined in JIS P8117, and is integrated on an inner side of the intake port so as to project into the upstream-side expanded space and so as to extend a duct wall of the intake port, and
 D representing a diameter of the opening end member and L representing a length, in an axis direction of the intake port, of a portion of the opening end member that is not fitting the intake port satisfy 0.25D≤L≤2.0D.

2. An air cleaner comprising:
 a hollow case;

a filter element; and an opening end member, wherein the hollow case defines an expanded space, the filter element defines an upstream-side expanded space and a downstream-side expanded space in the expanded space, the case includes an intake port configured to bring an upstream-side duct into communication with the upstream-side expanded space, and an exhaust port configured to bring a downstream-side duct into communication with the downstream-side expanded space, the opening end member is formed from a material having an air permeability in a range of 0.3 to 100 sec/300 cc measured by a method in conformity with the Gurley test method defined in JIS P8117, and is integrated on an inner side of the exhaust port so as to project into the downstream-side expanded space and so as to extend a duct wall of the exhaust port, and D representing a diameter of the opening end member and L representing a length, in an axis direction of the exhaust port, of a portion of the opening end member that is not fitting the exhaust port satisfy $0.25D \leq L \leq 2.0D$.

3. An air cleaner comprising:

a hollow case;

a filter element; and an opening end member, wherein the hollow case defines an expanded space, the filter element defines an upstream-side expanded space and a downstream-side expanded space in the expanded space, the case includes an intake port configured to bring an upstream-side duct into communication with the upstream-side expanded space, and an exhaust port configured to bring a downstream-side duct into communication with the downstream-side expanded space, the opening end member is formed from a material having an air permeability in a range of 0.3 to 100 sec/300 cc measured by a method in conformity with the Gurley test method defined in JIS P8117, one of the opening end member is integrated on an inner side of the intake port so as to project into the upstream-side expanded space and so as to extend a duct wall of the intake port, another of the opening end member is integrated on an inner side of the exhaust port so as to project into the downstream-side expanded space and so as to extend a duct wall of the exhaust port, and D representing a diameter of the one of the opening end member and L representing a length, in an axis direction of the intake port, of a portion of the one of the opening end member that is not fitting the intake port satisfy $0.25D \leq L \leq 2.0D$.

4. The air cleaner according to claim 1, wherein a thickness of the air-permeable material of the opening end member is in a range of 0.5 to 5 mm.

5. The air cleaner according to claim 2, wherein a thickness of the air-permeable material of the opening end member is in a range of 0.5 to 5 mm.

6. The air cleaner according to claim 3, wherein a thickness of the air-permeable material of the opening end member is in a range of 0.5 to 5 mm.

7. The air cleaner according to claim 4, wherein a reinforcement body is integrated with the opening end member.

8. The air cleaner according to claim 5, wherein a reinforcement body is integrated with the opening end member.

9. The air cleaner according to claim 6, wherein a reinforcement body is integrated with the opening end member.

* * * * *